(12) United States Patent
Tymchenko (10) Patent No.: US 6,909,922 B2
(45) Date of Patent: Jun. 21, 2005

(54) APPARATUS, METHOD AND COMPUTER SYSTEM FOR REDUCING POWER CONSUMPTION OF A PROCESSOR OR PROCESSORS UPON OCCURRENCE OF A FAILURE CONDITION AFFECTING THE PROCESSOR OR PROCESSORS

(75) Inventor: Viktor Andrew Tymchenko, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 464 days.

(21) Appl. No.: 09/955,007

(22) Filed: Sep. 10, 2001

(65) Prior Publication Data

US 2003/0050714 A1 Mar. 13, 2003

(51) Int. Cl.[7] ................................................ G06F 11/22
(52) U.S. Cl. ...................... 700/21; 700/79; 700/292; 702/182; 713/322; 714/47
(58) Field of Search ................................ 700/2, 21, 79, 700/80, 292, 299, 300; 702/132, 182; 714/25, 47; 713/300, 322

(56) References Cited

U.S. PATENT DOCUMENTS

| | | | | | |
|---|---|---|---|---|---|
| 5,483,102 A | * | 1/1996 | Neal et al. | .................. | 257/712 |
| 5,574,667 A | * | 11/1996 | Dinh et al. | ................. | 700/300 |
| 5,612,677 A | * | 3/1997 | Baudry | ....................... | 340/584 |
| 5,713,030 A | * | 1/1998 | Evoy | ........................... | 713/322 |
| 5,805,403 A | * | 9/1998 | Chemla | ...................... | 361/103 |
| 5,835,885 A | * | 11/1998 | Lin | ............................ | 702/99 |
| 5,940,786 A | * | 8/1999 | Steeby | ....................... | 702/132 |
| 6,014,611 A | * | 1/2000 | Arai et al. | .................. | 702/132 |
| 6,141,762 A | * | 10/2000 | Nicol et al. | ................. | 713/300 |
| 6,226,556 B1 | * | 5/2001 | Itkin et al. | .................... | 700/21 |
| 6,363,490 B1 | * | 3/2002 | Senyk | ........................ | 713/300 |
| 6,393,374 B1 | * | 5/2002 | Rankin et al. | .............. | 702/132 |
| 6,415,388 B1 | * | 7/2002 | Browning et al. | .......... | 713/322 |
| 6,470,238 B1 | * | 10/2002 | Nizar et al. | ................. | 700/299 |
| 6,470,289 B1 | * | 10/2002 | Peters et al. | ................ | 702/132 |
| 6,510,400 B1 | * | 1/2003 | Moriyama | .................. | 702/132 |

FOREIGN PATENT DOCUMENTS

JP 358001202 A * 1/1983

* cited by examiner

Primary Examiner—Emanuel Todd Voeltz
(74) Attorney, Agent, or Firm—Kenyon & Kenyon (57) ABSTRACT

An apparatus, a method and a computer system can be used to reduce power consumption of one or more processors in response to a failure condition such as an overtemperature condition affecting the processor or processors. A signal is provided which indicates a failure condition affecting the processor such as an overtemperature condition or a failure or reduction in performance of a cooling mechanism. In response to the signal, a power consumption of the processor is periodically reduced. This can be accomplished by providing a periodic signal to an input of the processor (e.g., a stop clock input or a processor enable input). The processor reduces power consumption by stopping an internal clock of the processor, for example. The periodic signal can be provided to the input of the processor to periodically reduce power consumption. In this manner, power consumption of the processor may be reduced without shutting down the processor entirely, while maintaining some processor functions and without missing the receipt of any signals corresponding to vital functions of the processor system while the power consumption of the processor is reduced.

30 Claims, 7 Drawing Sheets

APPARATUS, METHOD AND COMPUTER SYSTEM FOR REDUCING POWER CONSUMPTION OF A PROCESSOR OR PROCESSORS UPON OCCURRENCE OF A FAILURE CONDITION AFFECTING THE PROCESSOR OR PROCESSORS

BACKGROUND OF THE INVENTION

The present invention relates to a method and an apparatus for reducing power consumption of one or more processors in response to a failure condition affecting the processor or processors such as a thermal failure condition, and to a computer system incorporating such a method and/or apparatus.

In recent years, the processing power of processors has been increasing at a high rate. This increase in processing power has caused processors to heat up faster and to a higher temperature than previous processors. Therefore as the processing power has increased, a need has arisen for cooling the processor so that an overtemperature condition does not occur, since damage to the processor can occur if the temperature remains at too high of a level.

As the processing power of processors has increased and the need for maintaining the processor at a relatively low temperature has become important, new ways of maintaining a relatively low temperature of the processor have been implemented. For example, heat sinks have been attached directly on or near the processor to help dissipate some of the heat from the processor. Additionally, cooling fans have been used to blow air in the general vicinity of the processor or at the processor to help keep the processor from overheating. However, even when taking these measures, overtemperature problems can occur. Additionally, with the increase of processing power, the requirement for large heat sinks, blowers, cooling fans or other cooling mechanisms can cause size and expense problems, and these mechanisms are still sometimes unable to properly cool some processors even when these cooling mechanisms are operating at full efficiency.

In case of a failure, the temperature of the processor can rise to an overtemperature condition even if a cooling fan, a heat sink, or another cooling mechanism normally is able to maintain the desired temperature of the processor. For example, the cooling fan may fail for some reason (i.e., the speed of the cooling fan may be reduced or it may completely stop). In this case, the temperature of the processor can rise to a level which creates damage to the processor. Additionally, as processing power increases in current generation and future generation processors, additional measures for maintaining the temperature of the processor may become necessary. Therefore, a need has arisen for additional ways of maintaining the temperature of the processor below a predetermined level. These additional measures may be in addition to or in place of current implementations using cooling devices such as heat sinks and cooling fans.

In addition to using cooling devices such as heat sinks and cooling fans, other methods for ensuring that the temperature of a processor or processors does not become too high have previously been contemplated. For example, a failure signal corresponding to a reduced performance of a cooling mechanism such as a cooling fan can be produced when the cooling mechanism either fails or has some sort of other reduction in performance thereof. This signal is then used to completely shut down the processor, or provide a warning signal to the user of a personal computer or to a network manager, for example. However, if the signal is sent to the personal computer user or network manager (or other user) without turning off the processor, continued use of the processor could result in damage to the processor or other components of the system. Similarly, if the processor is shut off, a resulting reduction in performance of the processor or processors occurs during the time which the processor is shut off. If the processor is shut down, it is not operational until the failure is resolved. If such a processor is included in a uni-processor system, a system crash will occur and the entire system is shut down.

Additionally, other problems can occur with respect to signals sent to the processor relating to vital functions of the system which are not received by the processor during the time which the processor is turned off. For example, the time-out of vital functions may occur if the processor is shut off for too long of a time period. These signals relating to vital functions of the system are sent to the processor for only a specific length of time before a time-out of the signal occurs. If this time-out occurs, the processor does not receive the signals or perform any functions in response to these signals relating to vital functions of the system. For example, if a LAN (Local Area Network) network card is inserted and expecting a response from the processor, the network cards might drop clients if the processor does not respond to certain signals prior to a time-out of those signals (i.e., within a predetermined time period). Therefore, a reduction of the power of a processor while still performing some processing functions would be beneficial so that the processor is not damaged and so that no vital functions of the processor or system are inadvertently not performed.

SUMMARY OF THE INVENTION

In accordance with the present invention, in order to reduce the power consumption of a processor, a failure signal is produced which indicates a failure condition affecting the processor. In response to the failure signal, the power consumption of the processor is periodically reduced. This failure condition affecting the processor may be a thermal failure condition (or over-temperature condition).

In an illustrated embodiment, the processor includes a reduced power input. Power consumption of a processor is reduced in response to a first signal level at the input and is not reduced in response to a second signal level at the input. A power reduction circuit provides the power reduction signal to the input of the processor in response to a failure condition affecting the processor. The signal provided to the input of the processor in response to the failure condition is a periodic signal alternately supplying the first signal level which causes a reduction in the power consumption of the processor and the second signal level which does not cause a reduction in the power consumption of the processor.

The present invention allows a reduction in power consumption of a processor or processors in an economical manner when a failure condition occurs. In described embodiments of the present invention, the failure condition is a thermal failure condition which occurs when the cooling mechanism fails or when a temperature of the processor or processors increases to a high level. The present invention performs this reduction in power consumption without shutting down the processor entirely. The processor is allowed to continue to function at a reduced performance level without missing the receipt of signals provided to the processor relating to functions of the system, which may include vital functions of the system.

In illustrated embodiments of the present invention, upon detection of a failure condition affecting the processor (such as a failure or a reduced performance of a cooling mechanism or a high temperature condition at or near the processor), the power consumption of the processor is periodically reduced. This periodic reduction in power consumption may be implemented by periodically stopping and starting an internal clock of the processor or periodically reducing the power consumption of the processor in any other manner.

DETAILED DESCRIPTION

Figure 1:
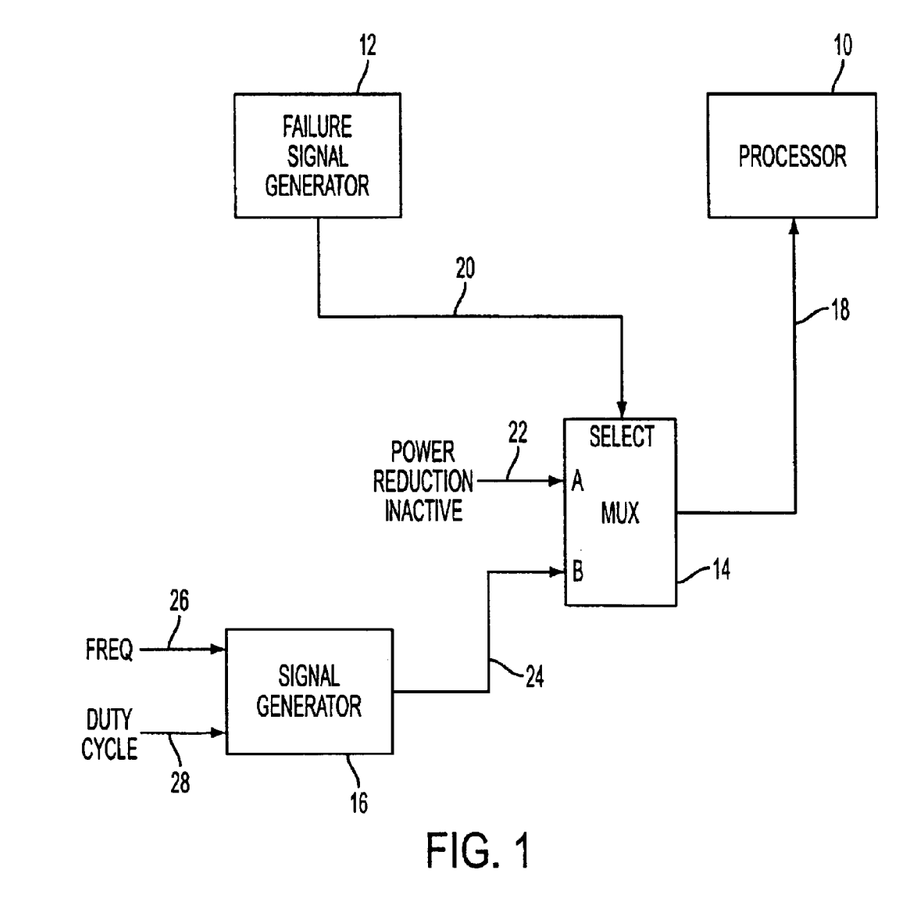
FIG. 1 illustrates an arrangement for reducing power consumption of a processor according to one embodiment of the present invention.

FIG. 1 illustrates an arrangement for reducing the power consumption of a processor according to a first embodiment of the present invention. Illustrated in FIG. 1 are a processor 10, a failure signal generator 12, a multiplexor 14 (MUX) and a signal generator 16. Processor 10 may be any processor or microprocessor including some processors of the microprocessor family developed by Intel Corporation commonly referred to as the x86 family of microprocessors (for example, the 80486, Pentium™ and Pentium Pro™ microprocessors). Additionally, processor 10 may be a later generation processor such as the Pentium Pro™ microprocessor or any other later generation processor.

In the illustrated embodiment, processor 10 includes a reduced power input 18. In response to an input signal at a predetermined level on this input 18, the processor takes some action to reduce its power consumption. For example, input 18 may be an input in response to which the internal clock of the processor 10 is stopped, thereby causing the processor to consume less power. The Pentium™ and Pentium Pro™ processors include an input terminal for a STPCLK input signal which, when at a low level, signifies a request to stop the internal clock of the processor and thereby cause the processor to consume less power. When the Pentium™ or Pentium Pro™ processor recognizes the STPCLK input signal, the processor will stop execution on the next instruction boundary, unless superseded by a higher priority input, and generate a Stop Grant Acknowledge cycle. When the STPCLK input signal is asserted, the Pentium™ or Pentium Pro™ processor will still respond to external snoop requests. Although the STPCLK signal in the Pentium™ and Pentium Pro™ processors is a signal in which the active (or asserted) state occurs when the signal is at a low voltage level, in another processor it could be active at a high level. Further, the processor need not have a STPCLK input. The present invention can be practiced using any processor input which stops the internal clock of the processor, regardless of whether the active or asserted state level is at the high or low voltage level. Some processors include inputs which are used to reduce the power consumption of the processor in some other way, or enable or disable the processor in some manner other than stopping the internal clock of the processor (e.g., a processor enable or processor disable input signal). In such a case, these inputs may also be used in embodiments of the present invention.

Failure signal generator 12 has an output on line 20 which represents a presence of a failure condition affecting the processor 10. Examples of failure conditions affecting the processor include a failure of a cooling fan cooling the processor or an overtemperature condition of the processor. However, according to an embodiment of the present invention, the signal on line 20 output by the failure signal generator 12 represents any failure condition affecting the processor 10.

Multiplexor 14 has two inputs A and B receiving signals on lines 20 and 22, a select line receiving a select signal on line 24, and one output coupled to the input 18 of the processor 10. As illustrated, the input on line 20 provided by the failure signal generator 12 is a signal representing a failure condition affecting the processor 10. The input on line 22 is a power reduction inactive signal corresponding to an inactive level of the power reduction input signal 18. The input on line 24 is connected to an output of signal generator 16. In response to the failure signal 20, multiplexor 14 selects either the signal on line 22 or the signal on line 24 and outputs that signal on line 18.

In response to failure signal 20, the multiplexor 14 selects either the output 24 of signal generator 16 or a power reduction inactive signal level on line 22 (in implementations using the Pentium™ and Pentium Pro™ processors or any other processors having a signal similar to the STPCLK signal, the power reduction inactive signal will be a high voltage level signal). In this manner, if failure signal 20 indicates that no failure condition affecting the performance of the processor 10 has occurred, the multiplexor 14 selects the power reduction inactive signal level 22 to be output to the power reduction input of the processor 10. In this case, the processor 10 operates without any reduction in power taking place. If the failure signal 20 indicates a failure condition of the processor 10, e.g., a reduction in power or failure of a cooling fan or sensed overtemperature of the processor 10, the multiplexor 14 selects the output 24 of signal generator 16 to be provided to the power reduction input of processor 10. Multiplexor 14 may be any standard multiplexor or even a simple single pole double switch switching between inputs 22 and 24 based on the failure signal 20.

Signal generator 16 has two inputs on lines 26 and 28, respectively, and provides an output on line 24. The input on line 26 is a signal representing a desired frequency and/or period and the input on line 28 is a signal representing a desired duty cycle. In response to inputs 26 and 28, signal generator 16 provides a digital periodic signal on line 24 having one high value and one low value for each period.

Signal generator 16 is a standard well-known signal generator which generates a digital periodic signal on line 24 responsive to inputs representing the desired frequency or period and/or duty cycle of the periodic signal to be provided to the power reduction input 18 of the processor 10. The duty cycle is defined as the ratio between the active level time period and the inactive level time period of the signal.

The frequency (or period) and duty cycle inputs to signal generator 10 may be predetermined values based on a variety of features of the system. For example, in determining the frequency (or period) input to the signal generator 16, a minimum processing interval and a maximum heat-up time must be considered. The minimum processing interval must be considered to ensure that all processing functions can be performed within the time provided. The maximum heat-up time is a function of the die size, the maximum ambient temperature, and any thermal resistances to ambient temperature. The maximum heat-up time must be considered to reduce any thermal variation between the active and inactive signal levels. In determining the duty cycle, the minimum processing interval, a short enough time to accommodate possible cooling failures such as fan failure, and an inactive time level which is short enough to ensure that no time-out conditions occur must all be considered. These considerations will vary depending upon the system in which the processor 10 and other power reduction circuitry elements such as failure signal generator 12, multiplexor 14 and signal generator 16 are included.

Figure 2:
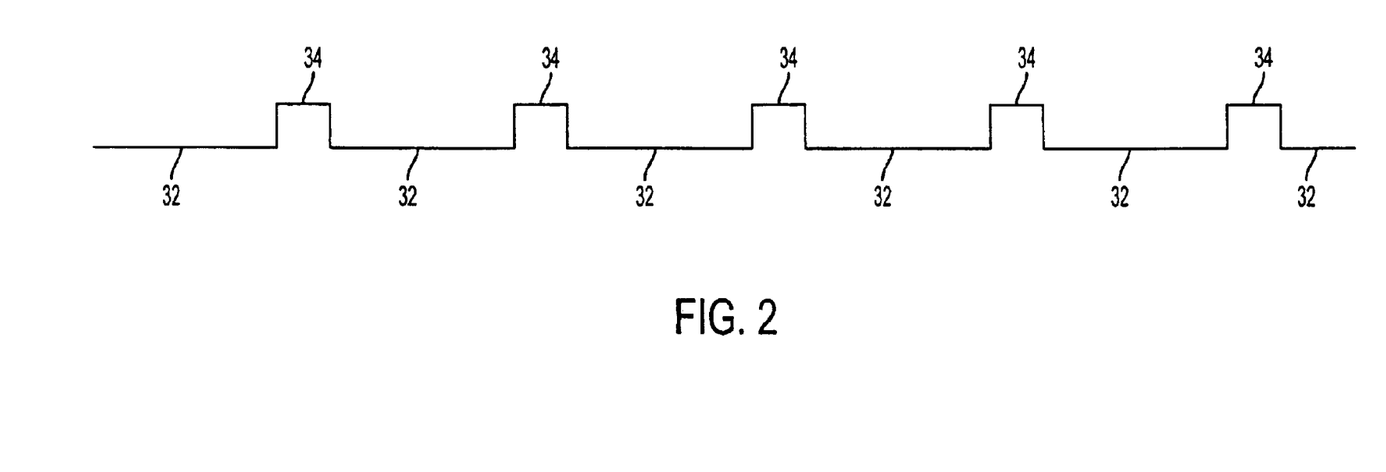
FIG. 2 illustrates a periodic signal provided by the signal generator illustrated in FIG. 1.

FIG. 2 illustrates an output signal from signal generator 16 which may be used in implementing embodiments of the present invention such as the embodiment illustrated in FIG. 1. The signal generator 16 generates a periodic signal including active signal levels 32 and inactive signal levels 34. The signal illustrated in FIG. 2 can be applied as the STPCLK input to the Pentium™ and Pentium Pro™ processors, i.e., it is a low voltage level active signal. Alternatively, the signal illustrated in FIG. 2 would be inverted in an embodiment of the present invention in which the stop clock input to processor 10 were a high voltage level active signal.

The signal illustrated in FIG. 2 can include a signal which may be output from signal generator 16 using the following system conditions: Pentium™ processor and EISA refresh timeout of 100 μsec. In such a system, a possible frequency of the signal illustrated in FIG. 2 is 100 kHz. Additionally, a possible duty cycle of the signal illustrated in FIG. 2 would be 25/75 (i.e., where the periodic signal has an active signal level 75% of the time and an inactive signal level 25% of the time).

While these values have been given as an example of the signal output from signal generator 16, any values providing a frequency and duty cycle meeting the following requirements may be used. Specifically, in determining the frequency, the minimum processing interval of the processor and/or the entire system and the maximum heat-up time must be considered. In determining the duty cycle, the minimum processing interval, the ensuring of enough inactive time to accommodate possible cooling failures, and an inactive time short enough to ensure that no time-out conditions occur should be considered. Additionally, any other input values may be used as inputs to the signal generator which may be used to describe a periodic signal (e.g., active and inactive level times, etc.)

Figure 3:
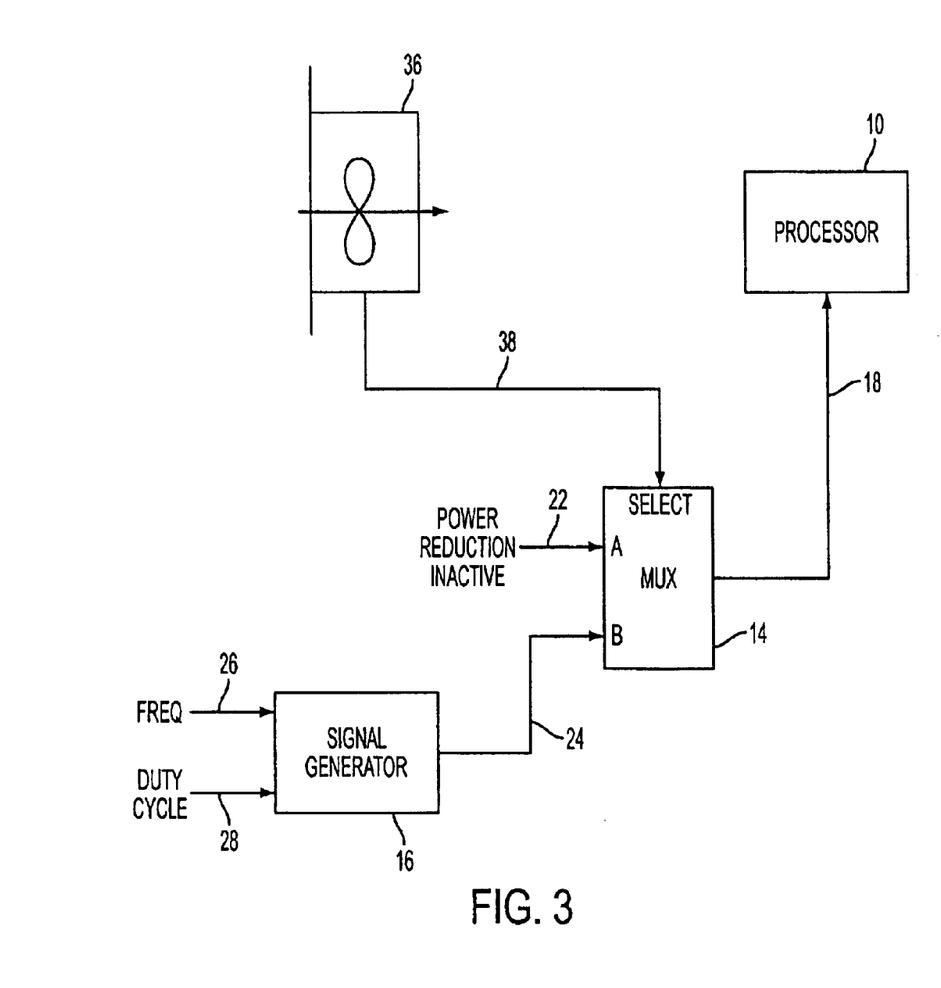
FIG. 3 illustrates an arrangement for reducing power consumption of a processor according to an embodiment of the present invention.

FIG. 3 illustrates an arrangement which may be used to reduce power consumption of a processor according to another embodiment of the present invention. FIG. 3 includes processor 10, multiplexor 14, signal generator 16 and cooling fan 36. Processor 10, multiplexor 14 and signal generator 16 function similarly to the corresponding elements of FIG. 1. Therefore, a description of these elements is not included in the description of FIG. 2.

Cooling fan 36 is used to blow cool air in the direction of the processor 10. This cool air is used to maintain the processor 10 at a temperature low enough so that damage to the processor 10 does not occur due to an overtemperature condition. If reduced performance of cooling fan 36 occurs (for example, a reduction in the speed of the cooling fan or a failure of the cooling fan altogether), a fan failure signal 38 is provided. This fan failure signal 38 is provided to the select input of multiplexor 14. The fan failure signal 38 may be directly provided from the cooling fan 36 or externally provided by a circuit detecting a failure or a reduced performance of the cooling fan 36. For example, an active level of the fan failure signal 38 may be provided if the speed of fan 12 falls below a predetermined level.

In the embodiment illustrated in FIG. 3, the multiplexor selects the power reduction inactive signal on line 22 if the fan failure signal 38 indicates no fan failure and selects the output of signal generator 16 on line 24 if the fan failure signal 38 indicates a fan failure. The power consumption of processor 10 is therefore periodically reduced based on the fan failure signal 38 the output of multiplexor 14 provided to the power reduction input 18 of the processor 10.

Figure 4:
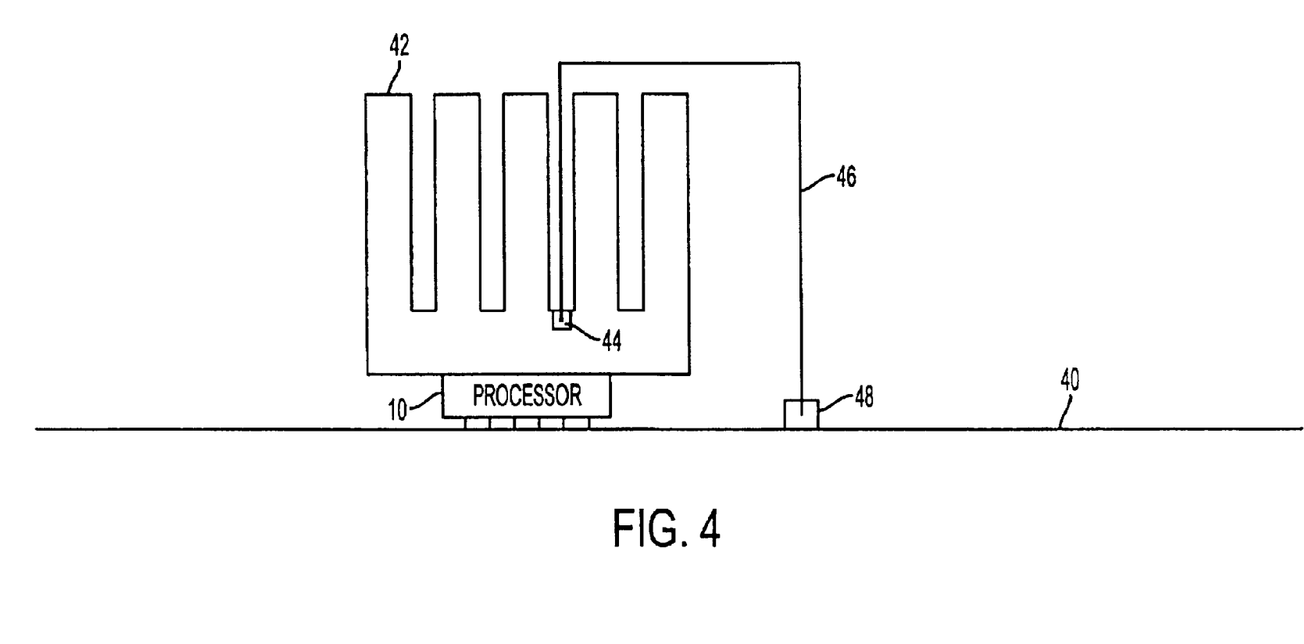
FIG. 4 illustrates an arrangement for reducing the power consumption of a processor according to an additional embodiment of the present invention.

FIG. 4 illustrates an arrangement which may be used to reduce the power consumption of a processor according to a further embodiment of the present invention. In FIG. 4, processor 10 is mounted, for example, on a printed circuit board (PCB) 40. A heat sink 42 is attached to processor 10 to provide an enhanced dissipation of heat from processor 10. A thermocouple 44 is embedded in heat sink 42 to measure a temperature near processor 10. Thermocouple 44 could be any temperature sensor device used to measure or sense the temperature at or near the processor 10 (such as a temperature sensor diode). Additionally, as an alternative to the thermocouple arrangement of FIG. 4, embodiments of the present invention may be practiced in which a device sensing any sort of failure at or near the processor 10 is used.

Thermocouple 44 provides an analog signal on line 46 to a connection 48 on the printed circuit board 40. This analog signal is representative of the temperature at or near the processor 10. The analog temperature value is used to provide a failure signal similar to the failure signal 20 of FIG. 1 to an arrangement similar to multiplexor 14 and signal generator 16, which provide an input to processor 10 used to reduce the power consumption of the processor in a manner similar to the arrangement of FIG. 1. An example of such an implementation is illustrated in FIG. 5.

Figure 5:
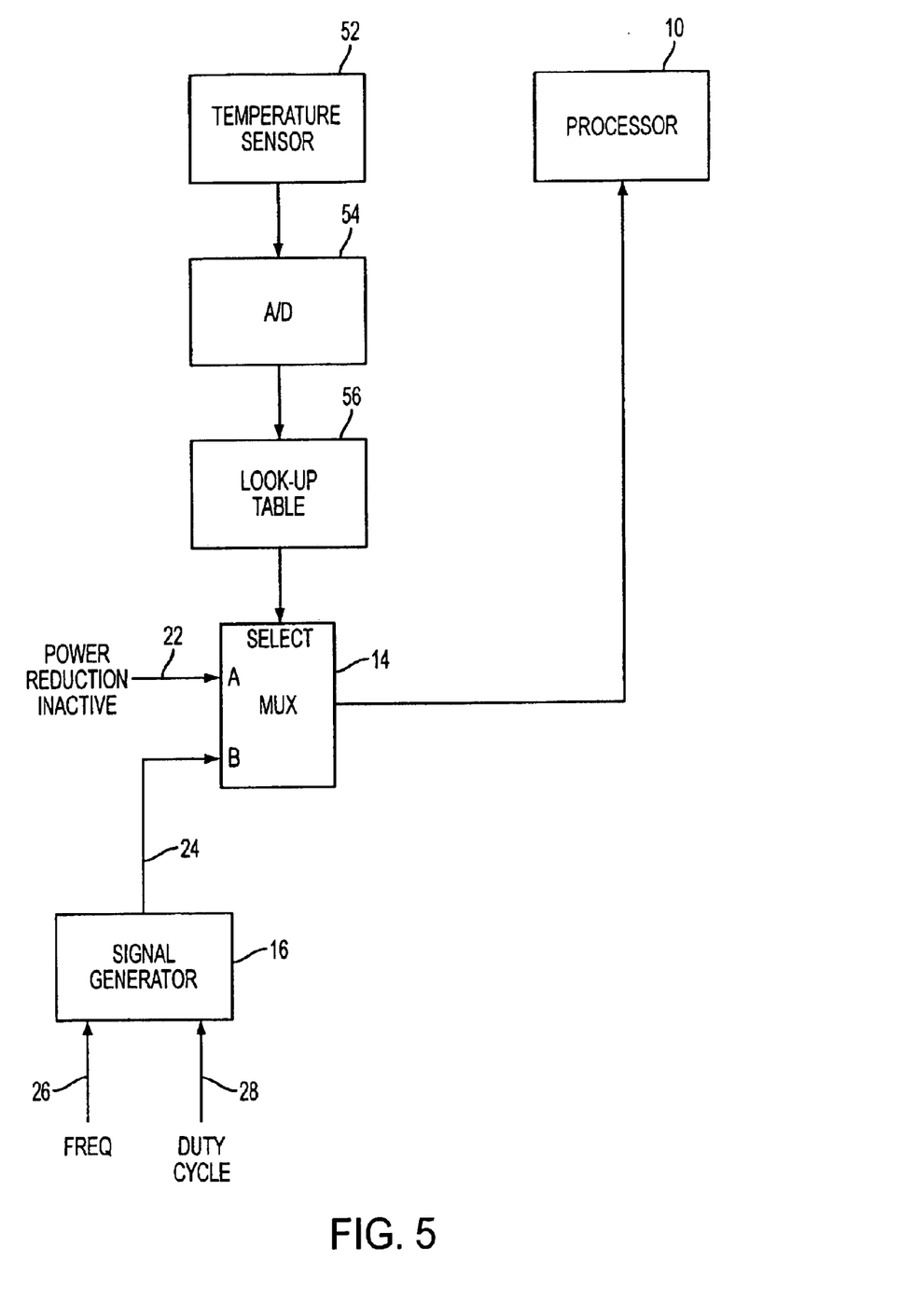
FIG. 5 illustrates an arrangement for reducing the power consumption of a processor according to a further embodiment of the present invention.

FIG. 5 illustrates an arrangement according to an embodiment of the present invention which may be used in conjunction with the arrangement illustrated in FIG. 4. FIG. 5 includes a processor 10, a multiplexor 14, a signal generator 16, a temperature sensor 52, an analog-to-digital (AID) converter 54 and a look-up table 56.

Temperature sensor 52 senses a temperature at or near processor 10. Temperature sensor 52 may be a thermocouple located on or near processor 10 (e.g., thermocouple 44 of FIG. 4) or any other temperature sensor. The sensed temperature output from temperature sensor 52 is provided to analog-to-digital (AID) converter 54. This signal may be provided, for example, via a connection such as connection 48 of FIG. 4. A/D converter 54 converts the sensed analog temperature to a digital signal representative of the temperature.

The digital signal output from A/D converter 54 and corresponding to the sensed temperature is provided to a look-up table 56. Look-up table 56 may be a Read Only Memory (ROM) or any other memory, for example. Look-up table 56 stores values to be provided to the select input oft. multiplexor 14 based on the sensed digital value. Each digital value has an entry storing a corresponding value to be provided to the select input of multiplexor 14. For example, any digital sensed values at or above a predetermined temperature will reference an entry in the look-up table 56 corresponding to that digital value and storing a select signal for the multiplexor 14 causing the multiplexor to select the output from the signal generator 16. Similarly, in response to any value lower than the predetermined temperature, the look-up table provides a select signal so that the multiplexor 14 selects the power reduction inactive signal. In this manner, the multiplexor 14 provides the periodic signal output by signal generator 16 when the temperature at or near the processor 10 sensed by temperature sensor 52 is at or above a predetermined temperature value (e.g., 45° C. or 85° C., etc.) and provides a power reduction inactive signal to the power reduction input of processor 10 when the sensed temperature is lower than that value. The predetermined temperature is preferably a temperature well below the temperature-at which the rated maximum wattage value of the processor will be reached.

As an alternative embodiment to the embodiment of FIG. 5, a comparator can be used in place of the look-up table 56. The comparator compares the temperature provided from A/D converter 54 with a predetermined temperature value and provides the result of the comparison to the select input of multiplexor 14.

Figure 6:
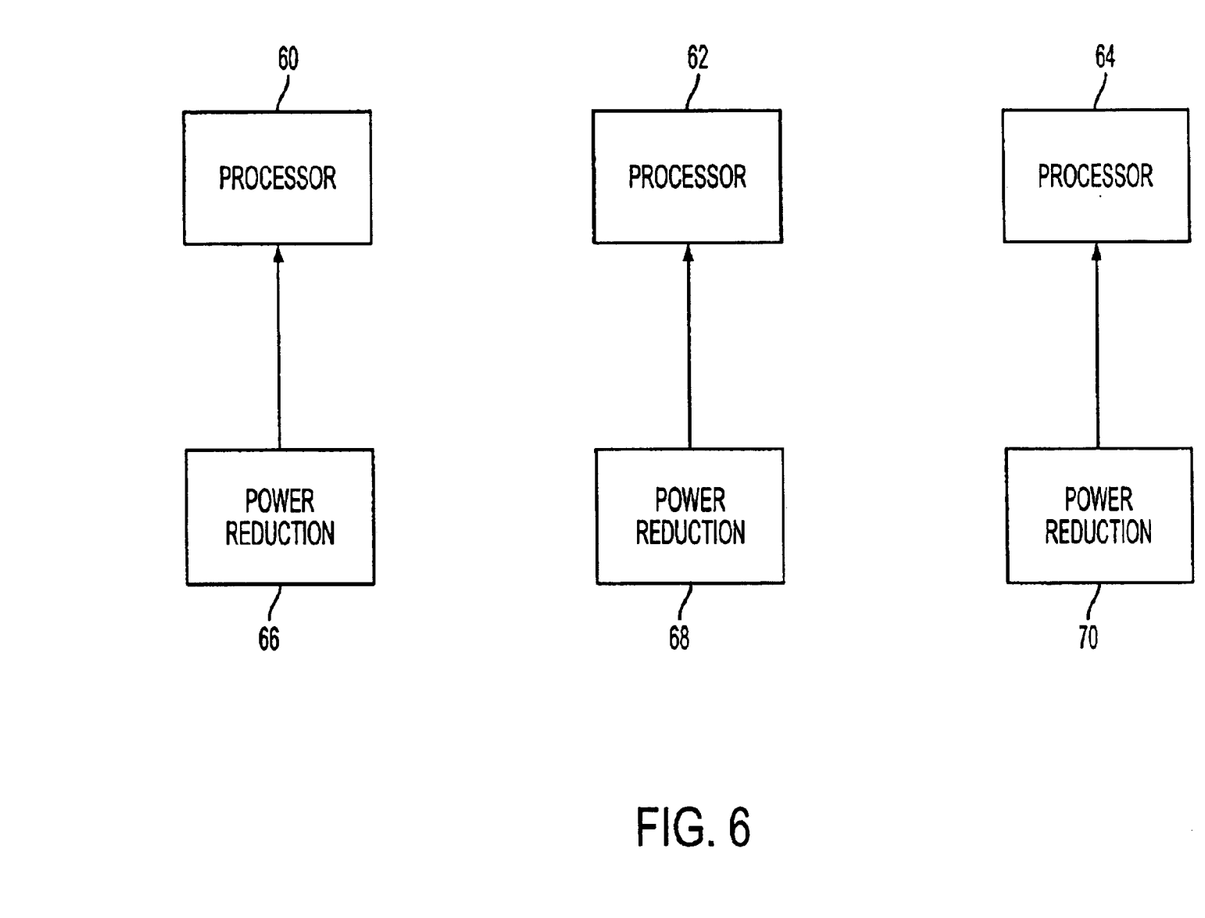
FIG. 6 illustrates a multi-processor system in which the power consumption of one or more processors may be reduced according to an embodiment of the present invention.

FIG. 6 illustrates an embodiment of the present invention in which a plurality of processors are arranged in a computer system. In FIG. 6, processors 60, 62 and 64 are included in a computer system such as a workstation or networking environment. Power reduction circuits 66, 68 and 70 are used to periodically reduce the power consumption of respective processors 60, 62 and 64 in response to a signal indicating a failure condition affecting the processor. Power reduction circuits 66, 68 and 70 may include the power reduction circuits illustrated in FIGS. 1, 3 and 4, for example. Specifically, power reduction circuits 66, 68 and 70 may each include a failure signal generator 12, a multiplexor 14 and a signal generator 16 as illustrated in FIG. 1, or may include a cooling fan 36, a multiplexor 14 and a signal generator 16 as illustrated in FIG. 3, or may include a temperature sensor 52 (or thermocouple 44), an analog-to-digital (A/D) converter 54, a look-up table 56, a multiplexor 14 and a signal generator 16 as illustrated in FIGS. 4 and 5. Each of the power reduction circuits 66, 68 and 70 may also be any other arrangement providing a signal used to periodically reduce the power consumption of a processor or processors. The power reduction circuits 66, 68 and 70 respectively provide a signal to the power reduction input of processors 60, 62 and 64 to periodically reduce the power of the respective processor.

The input signal to the power reduction circuits corresponding to a reduction in performance of the processor could relate to a failure or reduction in performance of a cooling fan blowing air toward the respective processor or a temperature (or overtemperature condition) at or near the respective processor.

Figure 7:
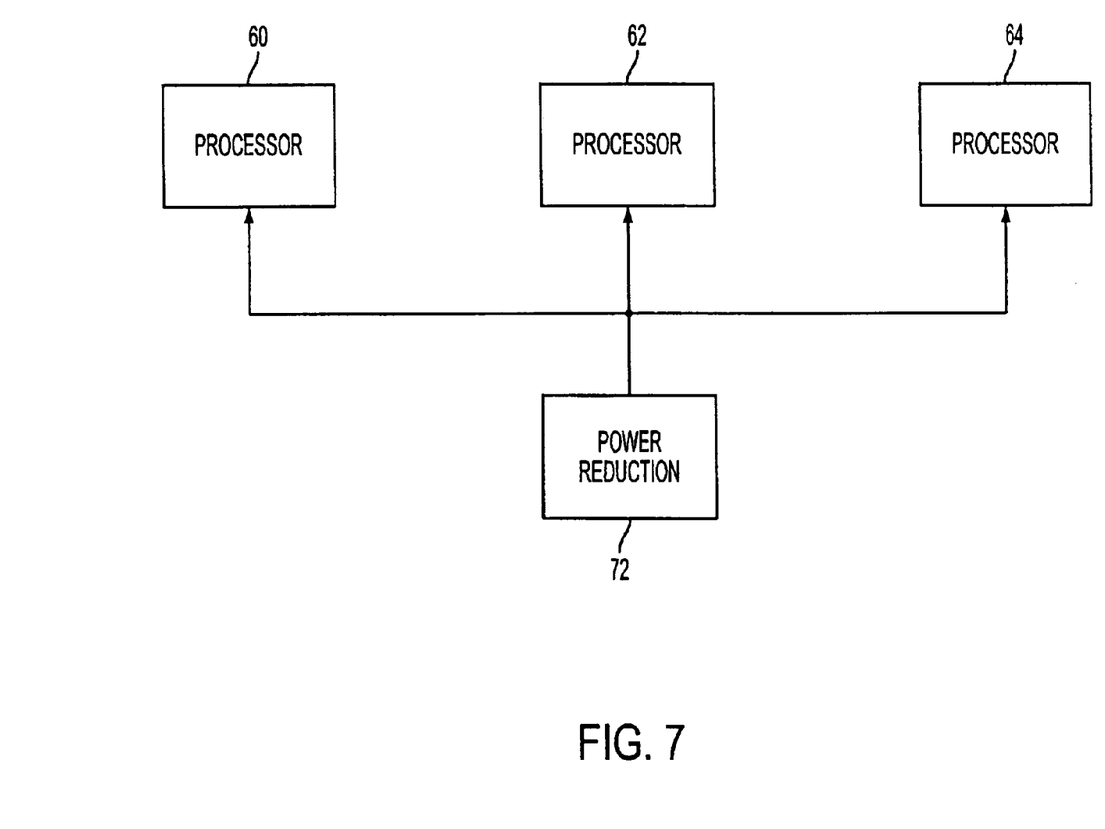
FIG. 7 illustrates an additional multi-processor system in which the power consumption of one or more processors may be reduced according to an embodiment of the present invention.

Alternatively, a multi-processor embodiment of the present invention can be used in which one power reduction circuit provides the periodic signal to the power reduction inputs of all of the processors upon detection of a failure condition at or near any of the processors or of a failure condition relating to an overall cooling mechanism such as a cooling fan which cools all of the processors, or any separate cooling fan corresponding to a particular processor. Such an embodiment is illustrated in FIG. 7. FIG. 7 includes a power reduction circuit 72 detecting a failure condition affecting one or more of the processors 60, 62 and 64 and providing a signal to the power reduction inputs of one or more (or all) of the processors 60, 62 and 64 in response to the failure condition to periodically reduce power consumption of one or more (or all) of the processors 60, 62 and 64.

While the multi-processor embodiments of FIGS. 6 and 7 have been illustrated in a three processor system, it is noted that embodiments of the present invention may be implemented in systems including any multiple number of processors (i.e., two or more processors). That is, multi-processor embodiments of the present invention are not limited to three processors.

What is claimed is:

1. A computer system comprising:
   a processor having an external input, such that said processor is to reduce power consumption of said processor by reducing a frequency of an internal clock of the processor if a signal at said external input is asserted; and
   a power reduction circuit coupled to said input of said processor and providing an output signal to said input of said processor in response to a failure condition affecting said processor such that the power consumption of said processor is periodically reduced based on said output signal.

2. A computer system according to claim 1, wherein a first signal level of the signal at the input of the processor stops an internal clock of the processor.

3. A computer system according to claim 1, wherein said signal provided to said input of said processor in response to said failure condition comprises a periodic signal including at least a first signal level and a second signal level.

4. A computer system according to claim 1, further comprising a cooling fan directing air toward said processor, wherein said failure condition affecting said processor corresponds to a reduced performance of said cooling fan.

5. A computer system according to claim 4, said power reduction circuit including a signal generator generating said periodic signal.

6. A computer system according to claim 5, wherein said signal generator includes inputs corresponding to characteristics of said generated periodic signal.

7. A computer system according to claim 5, wherein said signal generator includes an input corresponding to a duty cycle of said generated periodic signal and an input corresponding to a frequency or a period of said generated periodic signal.

8. A computer system according to claim 1, wherein said power reduction circuit detects a temperature of said processor, wherein said failure condition affecting said processor is detected when said detected temperature of said processor is above a predetermined temperature.

9. A computer system according to claim 1, wherein said power reduction circuit includes a sensor detecting a temperature of said processor, wherein said failure condition affecting said processor is detected when said sensed temperature of said processor is above a predetermined temperature.

10. A computer system according to claim 9, wherein said sensor comprises a temperature sensor embedded in a heat sink attached to said processor.

11. A computer system according to claim 3, said power reduction circuit including a switch providing said periodic signal to said input in response to a presence of said failure condition affecting said processor, said switch providing said second signal level to said input in response to an absence of said failure condition affecting said processor.

12. A computer system according to claim 3, said power reduction circuit including a multiplexor providing said periodic signal to said input in response to a presence of said failure condition affecting said processor, said multiplexor providing said second signal level to said input in response to an absence of said failure condition affecting said processor.

13. A computer system according to claim 1, wherein said failure condition affecting said processor is a thermal temperature condition corresponding to an overtemperature condition of said processor at or near said processor.

14. A computer system according to claim 1, said computer system further comprising:
at least one additional processor each having an input, wherein a power consumption of each processor is reduced in response to a first signal level of the input of that processor and is not reduced in response to a second signal level of the input of that processor; and
at least one additional power reduction circuit, each said additional power reduction circuit respectively corresponding to each said at least one additional processor and providing a signal to said input of said corresponding processor in response to a failure condition affecting the corresponding processor, wherein said signal provided to said input of said corresponding processor comprises a periodic signal including at least the first signal level and the second signal level.

15. An apparatus for reducing a power consumption of a processor, comprising:
a signal generator to generate a failure condition signal indicating a failure condition affecting said processor; and
a power reduction circuit responsive to said failure condition signal and providing a periodic signal to periodically reduce power consumption of said processor, said processor including an external input such that said processor is adapted to reduce power consumption by reducing a frequency of an internal clock of said processor when a signal at said external input asserted.

16. An apparatus according to claim 15, wherein said apparatus includes said processor, and said processor has a power consumption reduction input, wherein said power reduction circuit provides said periodic signal to said power consumption reduction input of said processor in response to said failure condition signal.

17. An apparatus according to claim 16, wherein an internal clock of the processor is stopped in response to the power consumption reduction input of the processor.

18. An apparatus according to claim 15, further comprising a cooling fan directing air toward said processor, wherein said failure condition affecting said processor corresponds to a reduced performance of said cooling fan.

19. An apparatus system according to claim 15, said power reduction circuit including a signal generator generating said periodic signal.

20. An apparatus according to claim 15, wherein said powerreduction circuit includes a sensor detecting a temperature of said processor, wherein said failure condition affecting said processor is detected when said sensed temperature of said processor is above a predetermined temperature.

21. An apparatus according to claim 20, wherein said sensor comprises a temperature sensor embedded in a heat sink attached to said processor.

22. An apparatus according to claim 16, said power reduction circuit including a switch providing said periodic signal to said power consumption reduction input in response to a presence of said failure condition affecting said processor.

23. An apparatus according to claim 16, said power reduction circuit including a multiplexor providing said periodic signal to said power consumption reduction input in response to a presence of said failure condition affecting said processor.

24. An apparatus according to claim 15, wherein said failure condition affecting said processor is a thermal failure condition corresponding to an overtemperature condition of said processor at or near said processor.

25. A method of reducing a power consumption of a processor, comprising:
detecting a failure condition affecting said processor; and
periodically reducing a power consumption of said processor in response to said detecting said failure condition by generating a periodic signal and supplying it to an external input to the processor, such that said processor is to reduce power consumption by reducing a frequency of an internal clock of said processor if a signal at said external input is asserted.

26. A method according to claim 25, wherein said step of periodically reducing the power consumption of said processor comprises periodically stopping an internal clock of said processor.

27. A method according to claim 25, further comprising a step of measuring a temperature at or near said processor and providing said signal indicating a failure condition affecting said processor in response to said measured temperature.

28. A method according to claim 25, further comprising a step of providing said signal indicating a failure condition affecting said processor in response to a reduction in performance of a cooling fan.

29. A method according to claim 25, wherein said failure condition affecting said processor corresponds to an overtemperature condition of said processor at or near said processor.

30. A method according to claim 25, wherein said failure condition affecting said processor is a thermal failure condition affecting a temperature of said processor.

* * * * *

UNITED STATES PATENT AND TRADEMARK OFFICE
CERTIFICATE OF CORRECTION

PATENT NO. : 6,909,922 B2 Page 1 of 1
APPLICATION NO. : 09/955007
DATED : June 21, 2005
INVENTOR(S) : Viktor Andrew Tymchenko

It is certified that error appears in the above-identified patent and that said Letters Patent is hereby corrected as shown below:

Claim 15, Column 9, Line 42 "external input asserted."
    should be --external input is asserted. --

Claim 20, Column 10, Line 5 "powerreduction circuit"
    should be --power reduction circuit--

Signed and Sealed this

Fourteenth Day of August, 2007

JON W. DUDAS
*Director of the United States Patent and Trademark Office*